United States Patent
Yamada

(10) Patent No.: US 11,064,091 B2
(45) Date of Patent: Jul. 13, 2021

(54) IMAGE FORMING APPARATUS WITH AUTOMATIC LOGOUT PROCESSING UNIT

(71) Applicant: KYOCERA Document Solutions Inc., Osaka (JP)

(72) Inventor: Yohei Yamada, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/791,360

(22) Filed: Feb. 14, 2020

(65) Prior Publication Data
US 2020/0274992 A1 Aug. 27, 2020

(30) Foreign Application Priority Data
Feb. 26, 2019 (JP) .............................. JP2019-032566

(51) Int. Cl.
*H04N 1/44* (2006.01)
*H04N 1/10* (2006.01)

(52) U.S. Cl.
CPC ............ *H04N 1/4433* (2013.01); *H04N 1/10* (2013.01); *H04N 2201/0094* (2013.01)

(58) Field of Classification Search
CPC .................................................. H04N 1/4433
USPC ....................................................... 358/1.14
See application file for complete search history.

(56) References Cited

U.S. PATENT DOCUMENTS

| 10,063,723 | B2 | 8/2018 | Ochi | |
|---|---|---|---|---|
| 2011/0320263 | A1 | 12/2011 | Yamada | |
| 2014/0096232 | A1* | 4/2014 | Tanabe | G06F 21/31 726/16 |
| 2015/0242167 | A1* | 8/2015 | Yamaguchi | G06F 3/1238 358/1.14 |
| 2016/0241741 | A1* | 8/2016 | Ochi | H04N 1/00469 |
| 2020/0195811 | A1* | 6/2020 | Otake | G06F 21/31 |

FOREIGN PATENT DOCUMENTS

| JP | 2007228209 A | 9/2007 |
|---|---|---|
| JP | 2012008765 A | 1/2012 |
| JP | 2016151920 A | 8/2016 |

* cited by examiner

*Primary Examiner* — Jacky X Zheng
(74) *Attorney, Agent, or Firm* — Studebaker & Brackett PC

(57) ABSTRACT

An image forming apparatus includes a login processing section and an automatic logout processing section. The login processing section executes login processing and logout processing for a user. The automatic logout processing section instructs the login processing section to execute the logout processing when a standby period elapses in a state in which no function for image formation is carried out and no operation on an operation section for the image forming apparatus is received during login by the user. The automatic logout processing section switches the standby period to a shortened period shorter than a normal period upon detection of a specific operation.

4 Claims, 3 Drawing Sheets

IMAGE FORMING APPARATUS WITH AUTOMATIC LOGOUT PROCESSING UNIT

INCORPORATION BY REFERENCE

The present application claims priority under 35 U.S.C. § 119 to Japanese Patent Application No. 2019-032566, filed on Feb. 26, 2019. The contents of this application are incorporated herein by reference in their entirety.

BACKGROUND

The present disclosure relates to an image forming apparatus having an automatic logout function.

Image forming apparatuses such as multifunction peripherals (MFP) are used under registration of a user account. A user is allowed to access information upon authorization and/or charged for according to a time of use.

Furthermore, security is ensured by a configuration in which the user logs in at a start of use and logs out at an end of use. However, in a situation in which a certain user leaves there while remaining logging in, the image forming apparatus may be in danger of being operated by another person.

Under the circumstances, in order to prevent unauthorized use, an image forming apparatus having such a login function (user authentication function) has an automatic logout function by which logout processing is executed automatically when no operation is done for a specific time period.

In such an image forming apparatus, a time until execution of automatic logout processing is adjusted according to the number of times of execution of the automatic logout processing.

Another image forming apparatus automatically logs out once a job is completed through reservation at a start of the job.

In still another image forming apparatus, a user is prompted to log out in a manner that a logout button is highlighted by gradually increasing in size relative to any other elements on a screen.

SUMMARY

An image forming apparatus according to an aspect of the present disclosure includes a login processing section and an automatic logout processing section. The login processing section executes login processing and logout processing for a user. The automatic logout processing section instructs the login processing section to execute the logout processing when a standby period elapses in a state in which no function for image formation is carried out and no operation on an operation section for the image forming apparatus is received during login by the user. The automatic logout processing section switches the standby period to a shortened period shorter than a normal period upon detection of a specific operation.

DETAILED DESCRIPTION

The following describes an embodiment of the present disclosure with reference to the accompanying drawings. Note that elements in the following embodiment that have the same function are labelled using the same reference signs.

The following specifically describes an embodiment of the present disclosure with reference to the accompanying drawings.

An image forming apparatus 1 according to the present embodiment is a multifunction peripheral having: a function as a scanner for reading an image of a document; a function as a copier for recording the read image on recording paper, a function as a facsimile machine for fax transmission of the read image; a function as a communication device for data transmission of the read image; and a function as a printer for recording received print data on recording paper.

Figure 1:
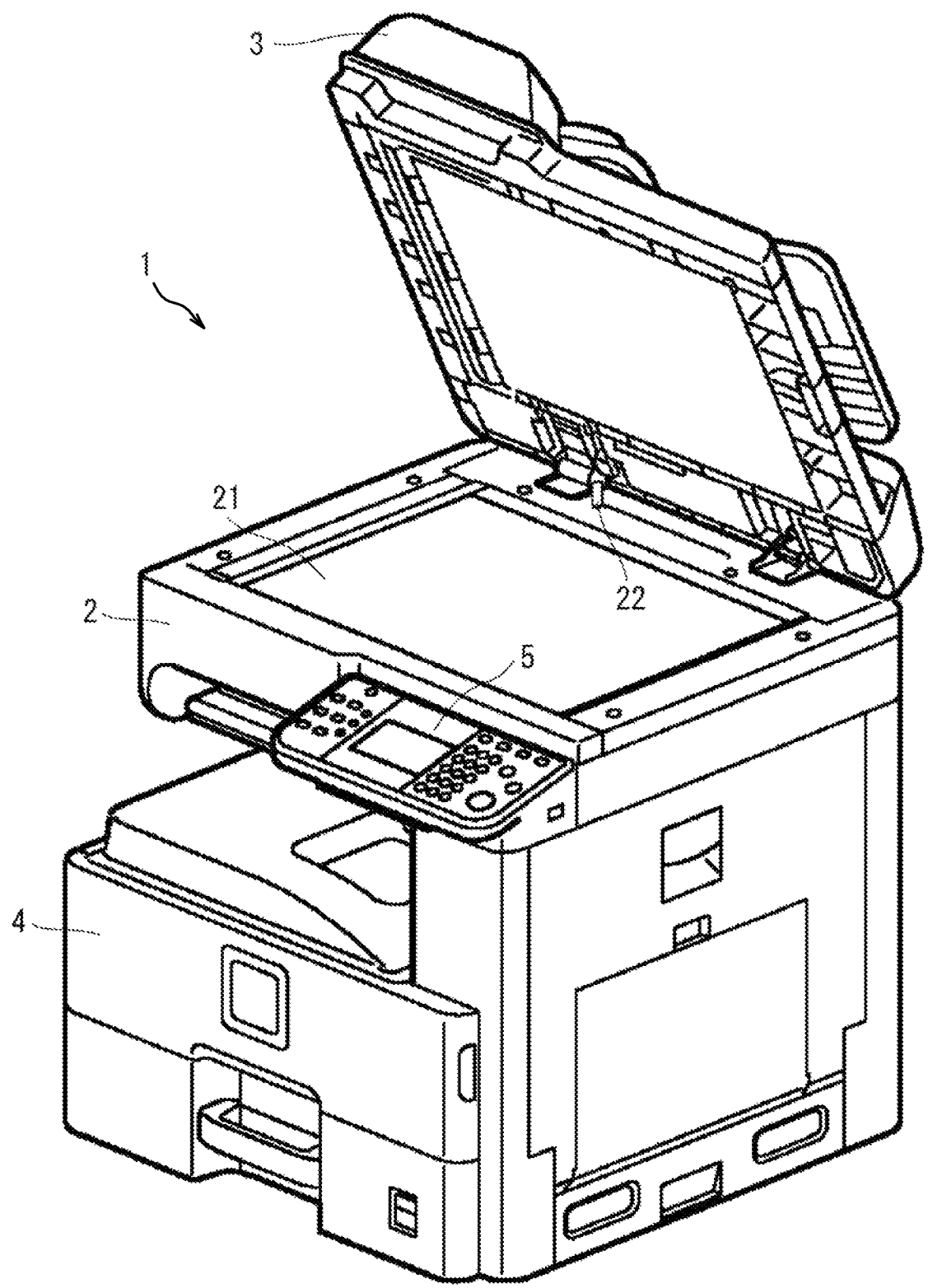
FIG. 1 is a perspective view of a configuration of an image forming apparatus according to an embodiment of the present disclosure.

Referring to FIG. 1, the image forming apparatus 1 includes a document reading section 2, a platen cover 3 configured as a document feeding section, a main body 4, and an operation section 5. The document reading section 2 is disposed above the main body 4. The platen cover 3 is disposed over the document reading section 2. The operation section 5 is disposed in the front of the image forming apparatus 1. The platen cover 3 and the document reading section 2 are connected to each other by means of a hinge mechanism at the rear of the image forming apparatus 1. When the platen cover 3 is opened upward from the front of the image forming apparatus 1, platen glass 21 placed on an upper surface of the document reading section 2 is opened.

The operation section 5 includes for example various operation keys and a touch panel through which settings and operation instructions for the image forming apparatus 1 are input.

The document reading section 2 includes for example a scanner including a light exposure lamp and a charge coupled device (CCD) sensor. The document reading section 2 reads a document loaded on the platen glass 21 or a document fed by a document feeding section to acquire image data. Here, the document feeding section is configured as the platen cover 3.

The document feeding section configured as the platen cover 3 includes a document loading section, a document conveying mechanism, and a document exit section. A document loaded on the document loading section is successively fed and conveyed to the document reading section 2 on a sheet-by-sheet basis by the document conveying mechanism, and then ejected onto the document exit section.

The platen cover 3 has a function of opening and closing a document loading surface (upper surface) of the platen glass 21. When the platen cover 3 is opened upward, the upper surface of the platen glass 21 is opened so that a document is allowed to be set on the platen glass 21. An opening and closing sensor 22 is provided for the document reading section 2 as an opening and closing detection section that detects opening and closing of the platen cover 3. The opening and closing sensor 22 is a microswitch that detects that an opening angle of the platen cover 3 exceeds a preset threshold angle. The opening and closing sensor 22 is turned on when the opening angle of the platen cover 3 is equal to or smaller than the threshold angle and turned off when the opening angle of the platen cover 3 exceeds the threshold angle.

The threshold angle according to which the opening and closing sensor 22 is turned on and off is set as below. The threshold angle is so set that light irradiation from a light source forms no image on a light receiver outside a range corresponding to a document when the document reading section 2 reads an image while the platen cover 3 is opened at the threshold angle.

In the above configuration, whether or not a document is loaded on the platen glass 21 can be detected through image reading by the document reading section 2 each time the opening and closing sensor 22 changes from a turning-off state to a turning-on state.

Figure 2:
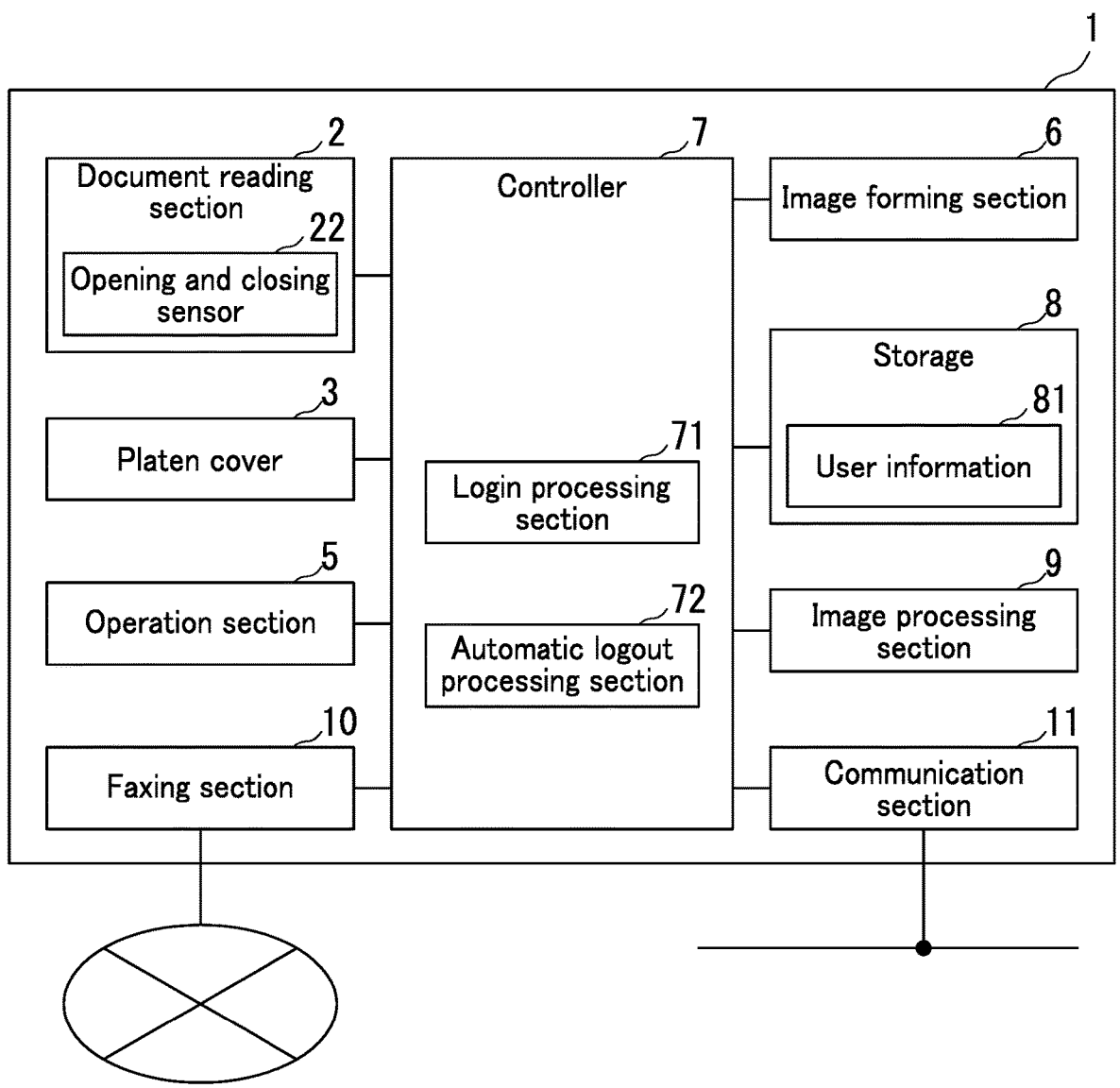
FIG. 2 is a block diagram of a schematic configuration of the image forming apparatus illustrated in FIG. 1.

The main body 4 includes an image forming section 6 (see FIG. 2). The image forming section 6 includes for example a photosensitive drum, a charger, a light exposure section, a developing section, a transfer section, a cleaner, and a fixing section, and records a formed image onto recording paper.

FIG. 2 is a block diagram of a schematic configuration of the image forming apparatus 1. A controller 7 is connected to the document reading section 2, the platen cover 3, the operation section 5, and the image forming section 6, and controls each operation of these elements. The controller 7 is also connected to storage 8, an image processing section 9, a faxing section 10, and a communication section 11.

The storage 8 is a storage means such as semiconductor memory or a hard disk drive (HDD), and is used as memory for image processing or memory for storing various settings. The storage 8 stores user information 81 therein. The user information 81 is identification information indicating for example a user ID or a password of a registered user, and is used for user authentication.

The image processing section 9 is an arithmetic operation circuit such as a microcomputer including for example a central processing unit (CPU), read-only memory (ROM), and random-access memory (RAM). The image processing section 9 executes various jobs for image processing such as zooming processing, density adjustment processing, and grayscale adjustment processing.

The controller 7 is an arithmetic processing circuit such as a microcomputer including for example a CPU, ROM, and RAM. The ROM stores therein a control program for controlling operation of the image forming apparatus 1. The controller 7 reads out the control program stored in the ROM and expands the read control program in the RAM to perform overall control on the image forming apparatus 1 according to various instruction information input through the operation section 5.

Furthermore, the controller 7 functions as both a login processing section 71 and an automatic logout processing section 72.

The login processing section 71 executes login processing for a user upon matching between the user information 81 and identification information such as a user ID or a password input through the operation section 5 or an unillustrated card reader, thereby allowing the user to use the image forming apparatus 1. The login processing section 71 executes logout processing to disallow the user to use the image forming apparatus 1 once a logout instruction is received from the automatic logout processing section 72 or the operation section 5.

The automatic logout processing section 72 instructs the login processing section 71 to execute logout processing when a standby period elapses in a state in which no function of the image forming apparatus 1 is carried out and no operation on the operation section 5 is received. In terms of security, logout processing is preferably executed as soon as an action or an operation is completed. However, logout processing during use of the image forming apparatus 1 leads to serious inconvenience. Therefore, the standby period is set to a normal period (for example, 60 seconds) which is long to some extent.

The automatic logout processing section 72 switches the standby period to a shortened period (for example, several seconds) shorter than the normal period once an operation after which the user highly probably leaves the image forming apparatus 1 is detected as a specific operation. The specific operation herein refers to for example a user operation of closing the platen cover 3 with no document loaded on the platen glass 21. The automatic logout processing section 72 instructs the login processing section 71 to execute logout processing when the standby period elapses in a state in which no function of the image forming apparatus 1 is carried out and no operation on the operation section 5 is received.

Figure 3:
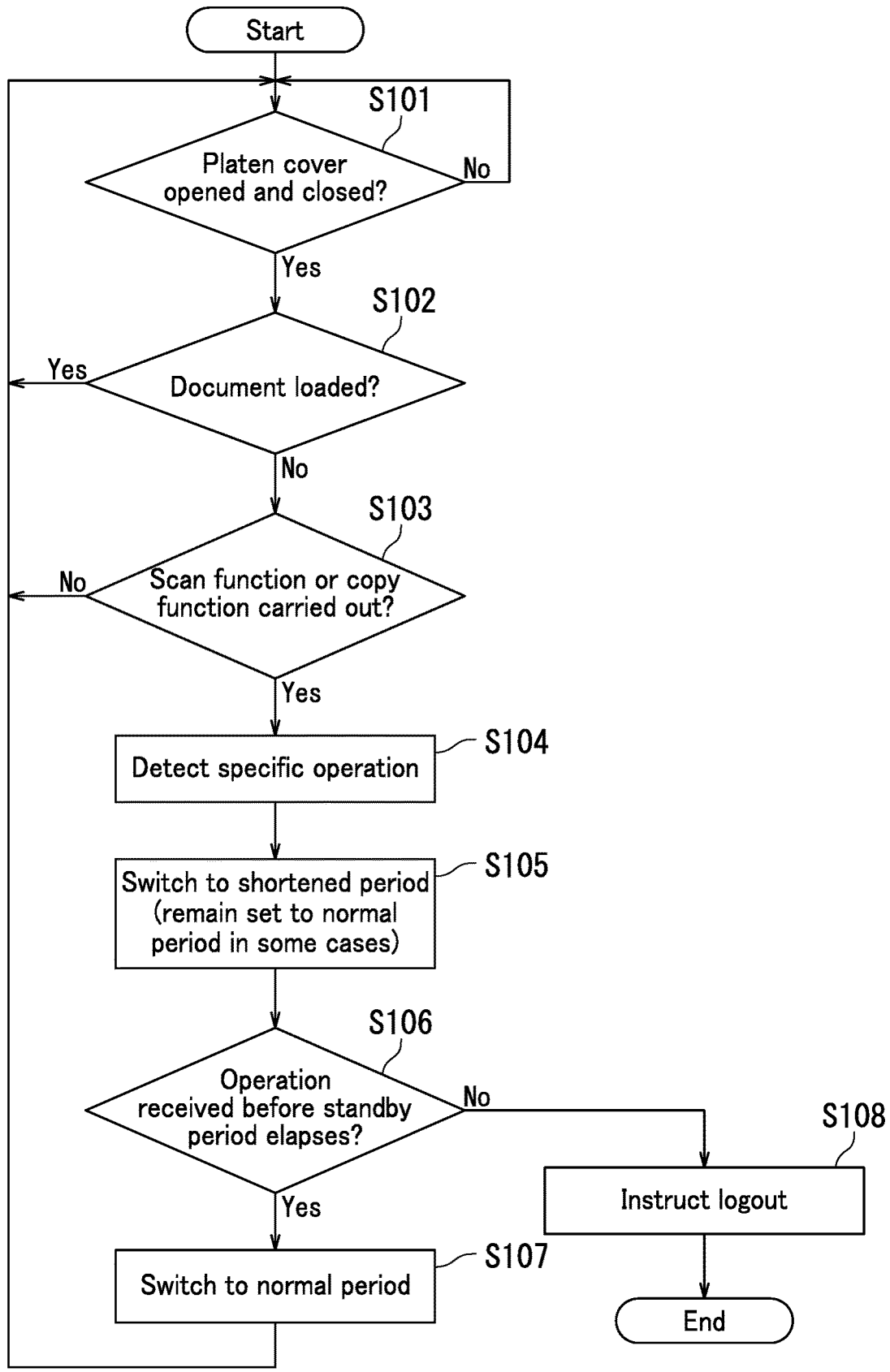
FIG. 3 is a flowchart depicting a condition on which a specific operation is detected by an automatic logout processing section illustrated in FIG. 2.

A condition on which the specific operation is detected by the automatic logout processing section 72 will be described in detail with reference to FIG. 3. Note that during the time when the specific operation is not detected in login by a user, the standby period until execution of automatic logout processing is set to the normal period.

The automatic logout processing section 72 monitors opening and closing of the platen cover 3 through monitoring output from the opening and closing sensor 22 during login by the user (Step S101).

When opening and closing of the platen cover 3 is detected, that is, when the opening and closing sensor 22 is switched from the turned-off state to the turned-on state, the automatic logout processing section 72 instructs the document reading section 2 to read an image, and determines whether or not a document is loaded on the platen glass 21 based on the read image.

When a document is loaded on the platen glass 21 in Step S102, the routine returns to Step S101 and the automatic logout processing section 72 monitors opening and closing of the platen cover 3.

When no document is loaded on the platen glass 21 in Step S102, the automatic logout processing section 72 determines whether or not the scan function or the copy function has been carried out for reading the document loaded on the platen glass 21 during login by a current user.

When either of the functions has not been carried out in Step S103, the routine returns to Step S101 and the automatic logout processing section 72 monitors opening and closing of the document feeding section 3 (platen cover).

When either of the functions has been carried out in Step S103, the automatic logout processing section 72 detects the specific operation (Step S104) and switches the standby period until execution of automatic logout processing to the shortened period (step S105). However, the standby period may remain set to the normal period in some cases even upon detection of the specific operation (Step S105).

The automatic logout processing section 72 then determines whether or not an operation has been received before the standby period has elapsed (Step S106).

When an operation has been received before the standby period has elapsed in Step 106, the automatic logout processing section 72 switches the standby period until execution of automatic logout processing to the normal period (Step S107). The process then returns to Step S101, and the automatic logout processing section 72 monitors opening and closing of the platen cover 3.

When the standby period has elapsed with no operation received in Step S106, the automatic logout processing section 72 instructs the login processing section 71 to execute logout processing (Step S108). The routine then ends.

Through the above, a user operation is detected as the specific operation in a situation in which no document is loaded on the platen glass 21 upon detection of opening and closing of the platen cover 3 after the scan function or the copy function has been carried out for reading the document loaded on the platen glass 21. In the above case, it is highly probable that the user finishing doing something leaves the image forming apparatus 1. Therefore, the automatic logout processing section 72 switches the standby period to the shortened period and instructs execution of automatic logout processing.

By contrast, it is probable that in a situation in which a document is loaded on the platen glass 21 upon detection of opening and closing of the platen cover 3, the user next uses the copy function for the document. Therefore, the standby period until execution of automatic logout processing remains set to the normal period. It is also probable that during the time until the platen cover 3 is opened with a document loaded on the platen glass 21, the user remains there until the user collects the document. Therefore, the standby period until execution of automatic logout processing remains set to the normal period. In addition, it is also probable that after the user changes a setting by operating the operation section 5 before the user opens the platen cover 3, the user uses the copy function for the next document. Therefore, the standby period until execution of automatic logout processing remains set to the normal period.

Note that in a situation in which the operation section 5 has received an operation for setting change after the scan function or the copy function is carried out before detection of opening and closing of the document feeding section 3 (platen cover) in Step S101, the automatic logout processing section 72 instructs execution of automatic logout processing after the normal period elapses without switching the standby period until execution of automatic logout processing to the shortened period even upon detection of the specific operation in Step S104. For example, it is probable that the user changes a setting to the next function after the scan function or the copy function is carried out. Even when the specific operation is detected in the above situation, it is highly probable that the user requests carrying out of the next function. Therefore, the standby period until execution of automatic logout processing remains set to the normal period.

As described above, the image forming apparatus 1 according to the present embodiment automatically performs logout processing when the standby period elapses in a state in which no function for image formation is carried out and no operation on the operation section 5 is received during login by the user. Furthermore, the image forming apparatus 1 includes the automatic logout processing section 72 that switches the standby period to the shortened period shorter than the normal period upon detection of the specific operation.

In the above configuration, automatic logout processing can be executed early after the user finishes using the image forming apparatus 1 through detection of an operation that highly probably invites the user finishing doing to leave there as the specific operation. Thus, an elapsed time until execution of automatic logout processing can be optimized, thereby increasing security.

The image forming apparatus 1 according to the present embodiment further includes the platen glass 21 on which a document is to be loaded, the platen cover 3 that opens and closes the document loading surface of the platen glass 21, the opening and closing sensor 22 functioning as an opening and closing detection section that detects opening and closing of the platen cover 3, and the document reading section 2 functioning as a document detection section that detects a document loaded on the platen glass 21. The automatic logout processing section 72 detects the specific operation when no document on the platen glass 21 is detected by the document detection section upon detection of opening and closing of the platen cover 3 by the opening and closing detection section.

In the above configuration, the automatic logout processing section 72 can instruct early execution of automatic logout processing through detection of an operation that highly probably invite the user finishing using the image forming apparatus 1 to leave there as the specific operation when a read document is removed from the platen glass 21 and the next document is not loaded thereon.

Furthermore, the automatic logout processing section 72 in the present embodiment switches the standby period to the normal period upon receipt of an operation on the operation section 5 before the standby period switched to the shortened period elapses.

In the above configuration, when there is a probability that the user keeps using the image forming apparatus 1, the image forming apparatus 1 waits for a relatively long specific period until the image forming apparatus 1 automatically performs logout processing. Thus, user convenience is not reduced.

Moreover, the automatic logout processing section 72 in the present embodiment detects the specific operation on a condition that the scan function or the copy function is carried out.

In the above configuration, a situation in which the image forming apparatus 1 automatically performs logout processing upon detection of the specific operation before the user uses the image forming apparatus 1 can be prevented.

The automatic logout processing section 72 in the present embodiment does not switch the standby period until execution of automatic logout processing to the shortened period even upon detection of the specific operation when the operation section 5 receives an operation for setting change after the scan function or the copy function is carried out.

In the above configuration, in a situation in which the user changes the current setting to a setting for the next function after carrying out of the scan function or the copy function, the standby period until execution of automatic logout processing can remain set to the normal period even upon detection of the specific operation because it is highly probable that carrying out of the next function is requested.

It is clear that the present disclosure is not limited to the above embodiment and each embodiment example can be altered as appropriate within a scope of technical concepts of the present disclosure. Furthermore, aspects of each of the aforementioned elements of configuration, such as the number, position, and shape are not limited to those in the above embodiment and can be changed to for example favorable number, position, and shape.

What is claimed is:

1. An image forming apparatus comprising:
   platen glass having a document loading surface on which a document is to be loaded;
   a platen cover configured to open and close the document loading surface of the platen glass;
   an opening and closing detection section configured to detect opening and closing of the platen cover;
   a document detection section configured to detect a document loaded on the platen glass;
   an operation section configured to receive operations for settings and operation instructions;

a login processing section configured to execute login processing and logout processing for a user; and an automatic logout processing section configured to instruct the login processing section to execute the logout processing when a standby period elapses in a state in which no function for image formation is carried out and no operation on the operation section for the image forming apparatus is received during login by the user, wherein the automatic logout processing section switches the standby period to a shortened period upon detection of a specific operation, the shortened period being shorter than a normal period, and when no document on the platen glass is detected by the document detection section upon detection of opening and closing of the platen cover by the opening and closing detection section, the automatic logout processing section detects the specific operation.

2. The image forming apparatus according to claim 1, wherein upon the operation section receiving an operation before the standby period switched to the shortened period elapses, the automatic logout processing section switches the standby period to the normal period.

3. The image forming apparatus according to claim 1, wherein the automatic logout processing section detects the specific operation on a condition that a scan function or a copy function is carried out.

4. An image forming apparatus comprising:

an operation section configured to receive operations for settings and operation instructions;

a login processing section configured to execute login processing and logout processing for a user; and an automatic logout processing section configured to instruct the login processing section to execute the logout processing when a standby period elapses in a state in which no function for image formation is carried out and no operation on the operation section for the image forming apparatus is received during login by the user, wherein the automatic logout processing section switches the standby period to a shortened period upon detection of a specific operation, the shortened period being shorter than a normal period, the automatic logout processing section detects the specific operation on a condition that a scan function or a copy function is carried out, and when the operation section receives an operation for setting change after carrying out of the scan function or the copy function, the automatic logout processing section does not switch the standby period until execution of automatic logout processing to the shortened period even upon detection of the specific operation.

* * * * *